US006810141B2

(12) United States Patent
Barbour

(10) Patent No.: US 6,810,141 B2
(45) Date of Patent: Oct. 26, 2004

(54) METHOD FOR PROCESSING SPATIAL-PHASE CHARACTERISTICS OF ELECTROMAGNETIC ENERGY AND INFORMATION CONVEYED THEREIN

(75) Inventor: Blair A. Barbour, Madison, AL (US)

(73) Assignee: Photon-X, Inc., Huntsville, AL (US)

( * ) Notice: Subject to any disclaimer, the term of this patent is extended or adjusted under 35 U.S.C. 154(b) by 728 days.

(21) Appl. No.: 09/849,749

(22) Filed: May 4, 2001

(65) Prior Publication Data

US 2002/0181761 A1 Dec. 5, 2002

(51) Int. Cl.$^7$ ................................................. G06K 9/00
(52) U.S. Cl. ........................................ 382/154; 382/103
(58) Field of Search ............................... 382/103, 154, 382/276; 348/148–157, 169–172; 359/333, 484; 345/632; 473/453; 463/1; 702/40

(56) References Cited

U.S. PATENT DOCUMENTS

| | | | | |
|---|---|---|---|---|
| 4,891,748 A | * | 1/1990 | Mann | 463/1 |
| 5,890,095 A | * | 3/1999 | Barbour et al. | 702/40 |
| 6,011,874 A | * | 1/2000 | Gluckstad | 382/276 |
| 6,031,545 A | * | 2/2000 | Ellenby et al. | 345/632 |
| 6,042,492 A | * | 3/2000 | Baum | 473/453 |
| 6,301,041 B1 | * | 10/2001 | Yamada | 359/333 |
| 6,671,390 B1 | * | 12/2003 | Barbour et al. | 382/103 |

OTHER PUBLICATIONS

Mine detection using a polarimetric IR sensor, by Barbour, IEE 196, pp. 78–82.*

* cited by examiner

Primary Examiner—Vikkram Bali
(74) Attorney, Agent, or Firm—Pearne & Gordon LLP

(57) ABSTRACT

A method of deriving increased information from electromagnetic energy. Values of any of several spatial phase characteristics of the electromagnetic energy are determined. The determined spatial phase characteristic values are used in a manner to provide information.

19 Claims, 10 Drawing Sheets

A

K1

SEG

METHOD FOR PROCESSING SPATIAL-PHASE CHARACTERISTICS OF ELECTROMAGNETIC ENERGY AND INFORMATION CONVEYED THEREIN

FIELD OF THE INVENTION

The present invention is directed to an apparatus and method that extracts and exploits information conveyed within spatial phase (e.g., three-dimensional geometry) characteristics of electromagnetic energy (e.g., light), and is particularly directed to an apparatus and method that extracts data via multi-characteristic spatial phase processing as a novel approach to providing information useful for imagery, data communication, and various other technology areas.

BACKGROUND OF THE INVENTION

Conventional imaging and/or detection systems employ intensity-based techniques to process electromagnetic energy proceeding from a source (e.g., an object). As one example of a conventional system, a spectroscopic system determines spectral (wavelength) composition of objects and scenes. The wavelengths that comprise the collected energy are separated with the use of a dispersive element employing refractive means, such as a prism, or diffractive means, such as a grating. After passing through one of these dispersive elements, the different wavelength components of the wave front propagate in different directions and the intensities of the components are recorded by an array of detector pixels. Such a standard spectrometer is an excellent device for determining the spectral composition of light emanating from a source object, but is unable to provide viable two-dimensional image integrity of the source object. Typically, such a spectrometer is not capable of determining spectral content on a pixel-by-pixel basis, and merely collects the total intensity of electromagnetic energy proceeding from an object.

Fourier transform and Fabry-Perot interferometer systems are capable of performing imaging spectrometry and determining the spectral composition of an object on a pixel-by-pixel basis. However, there are certain limitations imposed by the geometry of these systems. For example, in both types of systems, field of view of is severely restricted.

For the Fourier transform interferometer, the length of the system, combined with the small size of the mirrors, restricts the field of view because optical rays will not propagate through the system for large angles. Therefore, the number of pixels that can be acquired is limited.

For the Fabry-Perot interferometer, a small field of view is the result of two main effects. First, the light coming from the source object undergoes multiple reflections within a mirrored optical cavity before emerging from the system. When the incident light comes from an off-axis point on the object, it enters the cavity at an incident angle other than zero. Consequently, as the light undergoes multiple reflections, it will "walk" along the mirrors and eventually leak out of the cavity. The result of this behavior is that, as the field of view increases, the energy throughput of the system decreases.

The second problem that results in a limitation of the field of view for the Fabry-Perot system has to do with band pass variation with field size. Since the effective mirror separation changes with field angle, so does the filter band pass. To minimize the spectral variation from the center to the edge of the field, the field of view has to be small. However, this will again limit the number of pixels that can be obtained.

Still another problem that can arise with respect to some known systems, such as the Fourier transform interferometer, deals with image registration. Typically, two-dimensional images are acquired as one mirror is scanned. Problems associated with scanning, such as mirror jitter, uneven scanning, or mirror walking, create registration problems between the images in the different spectral bands.

In addition, many known systems employ scanning to acquire the spectral composition of the electromagnetic energy proceeding from a source object. During such scanning, it difficult to obtain the spectral composition in real-time while maintaining a high signal-to-noise ratio. This is not only a problem for the Fourier transform and Fabry-Perot interferometers, but also for electrically scanned systems such as liquid crystal systems and acousto-optic tunable filter based imaging spectrometers, which have the additional problem of relatively low transmission.

Tomographic-based methods are sometimes used for imaging spectrometry tasks. Tomographic methods negate the need for scanning. However, the downside of this technique is that it is computationally intensive, requiring the mathematically determination of a system matrix, which is usually application specific.

Turning attention to data transmission, it is to be appreciated that numerous techniques and methodologies have been employed. In general, data is conveyed via change (e.g., modulation) of a parameter of transmitted EM energy. For example, amplitude modulation (AM), frequency modulation (FM), quadrature amplitude modulation (QAM), phase modulation, pulse width modulation (PWM), amplitude shift keying (ASK), frequency shift keying (FSK), etc. are techniques and methods that are employed. However, each known technique and methodology has an associated limitation on the amount of information that can thereby be conveyed. However, the inventor has recognized that spatial phase characteristics of electromagnetic energy can be utilized to convey information, and convey greater quantities of information than conventional techniques and methodologies.

Returning again to imaging, conventional detection and identification is predominately done with standard video cameras. Standard video cameras are limited in outputting an 8-bit monochrome intensity scale with limited information. Most efforts in the past have been spent on algorithms and faster processing in an attempt to pull enough information out of the standard video to accurately identify targets of interest. Small advances in the ability of the sensor to collect additional information should increase recognition algorithms by orders of magnitude due to the already advanced state of processing and algorithm development.

Typical 3-D systems fall into several categories, all of which are markedly limited. One type of system requires exact and constant distances from subject and multiple cameras coupled with triangulation algorithms to create 3-D stereovision. This approach is limited to one distance and multiple camera locations. Another approach is to use shadows on the subject to calculate the 3-D curvatures. Complex algorithms that require known lighting positions limit shadow analysis. Another method that has been tried unsuccessfully is laser-gated pulses. This technique works reasonably well for large objects such as tanks but no modifications are on the horizon to adapt the technology to small facial features and contours. Additionally, laser illumination is a potential safety hazard to human subjects. The time-gated technique has a time resolution issue for smaller features.

As mentioned above, conventional imaging techniques employ intensity collection techniques. However, it is to be noted that, in distinction, spatial phase is intensity independent. Spatial phase characteristics of electromagnetic energy include characteristics of the plurality of polarizations (e.g., linear and circular) that are present within the electromagnetic energy. Spatial phase characteristics of electromagnetic energy also include characteristics of the shape or form of the waves present within the electromagnetic energy.

Focusing on polarization, several types of utilization are known. As one type of utilization of polarization characteristics, polarimetry identifies, isolates, and/or uses a generalized polarization of electromagnetic energy. In the past, scientists have used polarimetry to filter imagery for specific applications. Polarization filters are used to collect polarization data, and classical polarization theory is used to determine one level of the spatial phase properties. However, overall spatial phase of a propagated electromagnetic wave can have a significant amount of information that is indicative of unique features about the wave history. For example, properties of an electromagnetic wave change as the wave interacts with media and changes as the wave transverses a surface. Also, the electromagnetic wave retains aspects that are indicative of the interactions with the media and the changes from surface interactions.

Therefore, while some of the prior art is capable of performing limited polarimetry and other intensity-based applications, it is not capable, for the reasons discussed, of providing true, multi-dimensional, real-time spatial phase imaging.

The inventor has recognized that a spatial phase system would solve the above-mentioned problems and also go further into the complete analysis of the phase information, which is contained in the electromagnetic energy. By the scientific analysis of all the radiation being transmitted, reflected, emitted and/or absorbed, one can determine its spatial-phase properties. The spatial-phase properties are those characteristics that convey information (e.g., an indication of the media through which a wave has passed) that could allow significant imaging abilities. Along these lines, the inventor has recognized that spatial phase is a technology with tremendous benefit potential. However, the existence of spatial-phase properties has not led to utilization of the spatial-phase properties. In one respect, utilization of spatial-phase properties has not occurred because of the lack of an ability (e.g., no devices, techniques, method, or processes) to utilize the properties.

SUMMARY OF THE INVENTION

In accordance with one aspect, the present invention provides a method of deriving increased information from electromagnetic energy. Values of any of several spatial phase characteristics of the electromagnetic energy are determined. The determined spatial phase characteristic values are used in a manner to provide information.

In accordance with another aspect, the present invention provides a method of deriving increased information from electromagnetic energy. One quantitative-existence value related to at least one spatial phase characteristic of the electromagnetic energy is determined for one portion of electromagnetic energy. Another quantitative-existence value related to at least another spatial phase characteristic of the electromagnetic energy is determined for the one portion of electromagnetic energy or the one spatial phase characteristic of the electromagnetic energy for another portion of electromagnetic energy. The one quantitative-existence value is quantified relative to the other quantitative-existence value. The quantification of the one quantitative-existence value relative to the other quantitative-existence value is used as information.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
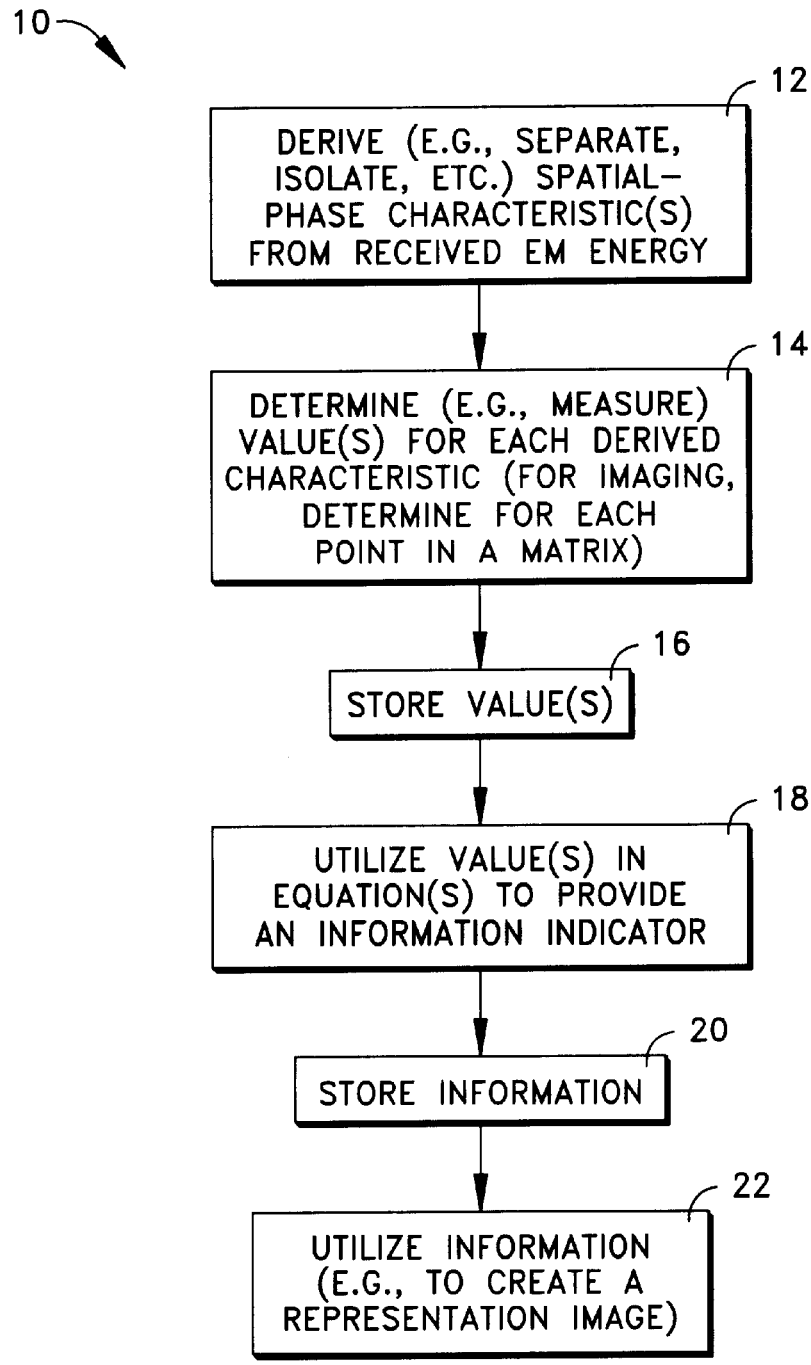
FIG. 1 is a flow block diagram of an example process in accordance with the present invention.

An example of a method process 10 in accordance with the present invention is shown in FIG. 1. It is to be appreciated that the shown example is a very general, top-level indication of the processing that is accomplished in accordance with the present invention. It is to be further appreciated that the type of processing is dependent upon the type of function for which the process is to be performed and also dependent upon the type of results that are being pursued.

For example, specific types may include processing to develop an image from spatial phase information. Another type of processing may be conveyance (e.g., transmission and/or reception) of information. Examples of desired results are related to specific types of spatial phase characteristics that are utilized and/or processed to achieve certain imaging or information conveyance results.

Specific examples include imaging with the aid of little or no ambient light (e.g., shadow penetration). Another specific example is imaging through an obscuring media (e.g., imaging a hidden target). Still yet another specific example is imaging to detect a visually non-descript target (e.g., image accentuation of certain objects, material, etc.). Some of the specific examples may include imaging with the aid of provided electromagnetic energy (e.g., light).

Specific examples of data conveyance include the use of any a viable spatial phase characteristic that is changed (e.g., modulated) to represent a data stream. Also, simultaneous transmission of plural data streams may be provided utilizing changes for plural, different spatial phase characteristics.

Turning to the process 10 of FIG. 1, at step 12, one or more spatial phase characteristics are derived from received electromagnetic energy. The derivation may be by any means such as separation, isolation, etc. Further, the derivation may be in the form of deriving spatial phase characteristics at each point within a plurality of points of a matrix (e.g., for imaging). As another example, the derivation may be to serially or sequentially derive spatial phase characteristics as the spatial phase characteristics change (e.g., are modulated). Such derivation is useful in at least the example of data transmission.

It is to be appreciated that the derivation of spatial phase characteristics may be by any suitable means. It is to be further appreciated that the means of derivation of the spatial phase characteristics is not intended to be a limitation on the subject invention. One example of an explanation of means to derive spatial phase characteristics is found in U.S. patent application Ser. No. 09/621,768, filed Jul. 21, 2000, which is expressly incorporated herein by reference.

Turning to the spatial phase characteristics that are derived, it is to be appreciated that any spatial phase characteristics may be derived. Examples of spatial phase characteristics that can be derived include any of several polarization characteristics.

Returning to the example of FIG. 1, at step 14 within the process 10, values associated with each of the derived characteristics are determined. For example, in an application that utilizes spatial phase characteristics to provide an image, spatial phase characteristics are determined for each of a plurality of points that comprise a matrix of points that are within the image.

At step 16, the determined values are stored. At step 18, the values are utilized in one or more equations to provide information indicators. It is to be appreciated that the determined values of the spatial phase characteristics are information indicators themselves and may need little or no additional processing via equation to provide information.

At step 20, the information (e.g., provided via calculation and equation or otherwise) is stored. At step 22, the information is utilized. In one example, information is utilized to create a representation image.

As discussed, spatial phase information utilization may take many forms. As one example, but not as a limitation of the subject invention, the spatial phase information is used to create an image. Again, it is to be appreciated that the image may represent any of numerous types of imagery. For example, the image may be a two-dimensional representation, a three-dimensional representation, shadow penetration, imaging through an obscuring media, material/color/texture/etc., highlighting, etc.

Figure 2:
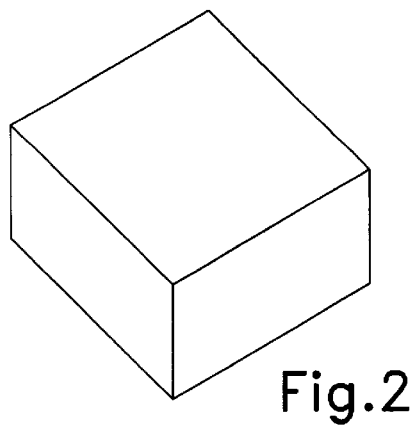
FIG. 2 is an illustration of an object having a plurality of distinct surfaces.
Figure 3:
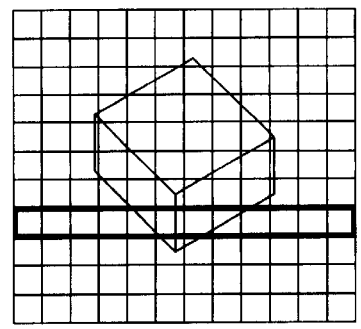
FIG. 3 is a representation of a matrix showing pixel locations associated with creating an image of the object of FIG. 2.

In order to provide an example of the processing in an easily understood example, attention is directed to FIG. 2 in which a box structure is shown. In FIG. 3, a representation of the box is shown on a template that indicates a plurality of points or pixels that are used in defining an image matrix. It is to be appreciated that the points are not fine, but very rough, and each point "covers" a large portion of the area/object that is to be imaged. It is to be appreciated that in actuality, the points or pixels may have a very fine resolution.

Figure 4:
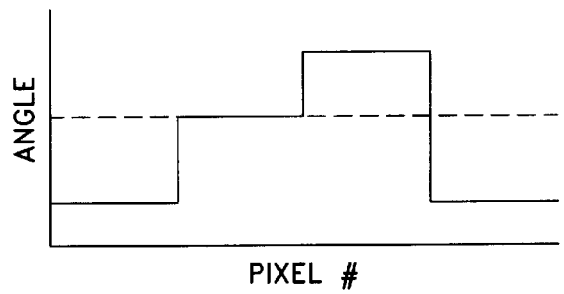
FIG. 4 is a graph showing surface angle orientation along one horizontal trace of pixels, which are indicated in bold in FIG. 3.

Turning back to FIG. 3, it is to be seen that one row of pixels is highlighted and that the one row of pixels extends from a portion of the background, across two surfaces of the box, and again to the background. FIG. 4 shows surface angle orientation along a transverse of the pixels. Thus, it is to be appreciated that even this very simple item (the box) has features (i.e., three-dimensionality) that are not readily presentable via conventional imaging techniques.

Turning to the presented example of the processing of the present invention, one example of processing calculations that are usable to provide information are Stokes vector equations. To provide the values for the equations, the polarization characteristics of EM energy are utilized. Again, it is to be recalled that use of polarization is but one example and is not a limitation on the subject invention.

Unpolarized light produces a DC signal that appears in a DC component of Fast Fourier Transform (FFT) data provided via FFT data analysis. Linearly polarized light provides a signal that has four maxima and minima that appear in a fourth harmonic component of the FFT data. Orientation of the linearly polarized signs determines the phase of the fourth harmonic component, as well as, contributes to the DC component. Circularly polarized light produces two maxima and minima that appear in a second harmonic component of the FFT data. Handedness (i.e., clockwise rotation or counterclockwise rotation) is associated with the phase of the second harmonic component.

The relative amplitudes of these four spatial phase characteristics indicate the degree of linear polarization, linear orientation, circular polarization, and handedness. Within the processing, these four spatial phase characteristics are quantitatively determined via the following equations. Specifically, the parameters of the Stoke vectors are obtained using the following equations:

$$S_0 = (A_c/2) - A_4$$

$$S_0 \approx TI \text{ (Total Intensity)}$$

$$S_1 = 2A_4$$

$$S_1 \approx S_{\perp 90}{}^0 \text{ (Selective sizing at planes 0°, 90°)}$$

$$S_2 = 2B_4$$

$$S_2 \approx S_{\perp 135}{}^{45} \text{ (Selective sizing at planes 45°, 135°)}$$

$$S_3 = -B_2$$

$$S_3 \approx DR_{RR} \text{ (Direction of Rotation of wave)}$$

where $A_0$ and $A_4$ are the real parts of the DC and fourth harmonic components respectively and $B_2$ and $B_4$ are the imaginary components of the second and fourth harmonic components.

From the Stokes vector of the polarization metrics (degree of polarization, degree of linear polarization, degree of circular polarization, and the ellipticity and orientation of the major axis) may be calculated according to the following:

$$DoP = \sqrt{\frac{S_1^2 + S_2^2 + S_3^2}{S_0}}$$

$$\text{Total Phase Term}^2 \approx \frac{S_{\perp 90}^2{}_0 + S_{\perp 135}{}_{45} + DR^2}{TI^2}$$

-continued $$DoLP = \sqrt{\frac{S_1^2 + S_2^2}{S_0}}$$

$$\text{Linear Term}^2 \approx \frac{S_{\perp 0}^2{}_{90} + S_{\perp 45}^2{}_{135}}{TI^2}$$

$$DoCP = \frac{|S_3|}{S_0}$$

$$\text{Circularity Term}^2 \approx \frac{DR}{TI}$$

$$DoUP = 1 - DoP$$

Scattered Term $\approx 1 -$ Total Phase Term $$X = \frac{1}{2}\tan^{-1}\frac{S_2}{S_1}$$

$$\text{Orientation} \approx \frac{1}{2}\tan^{-1}\frac{S_{\perp 135}^{\perp 45}}{S_{\perp 90}^{\perp 0}} \approx \theta$$

$$X = \frac{DoCP}{DoP}$$

$$\% \text{ of Circlarity} \approx \frac{\text{Circularity Term}}{\text{Total Phase Term}}$$

where DoP is the degree to which the light is polarized ($0 \leq DoP < 1$), DoLP is the degree to which the light is linearly polarized, DoCP is the degree to which the light is circularly polarized and DoUP is the degree to which the light is unpolarized, $\theta$ is the orientation of the major axis of the polarization vector, and X is the ellipticity of the polarization vector.

$$\theta_{i,j} := .5 \, atan\left(\frac{S2_{i,j}}{S1_{i,j} + .00000000001}\right)$$

$$\theta_{i,j} = \begin{vmatrix} \left(\theta_{i,j} - \frac{\Pi}{2}\right) & \text{if } (S1_{i,j} < 0 \wedge S2_{i,j} < 0) \\ \left(\theta_{i,j} - \frac{\Pi}{2}\right) & \text{if } (S1_{i,j} < 0 \wedge S2_{i,j} > 0) \\ \theta_{i,j} & \text{otherwise} \end{vmatrix} \quad \Theta := \theta \cdot \frac{180}{\Pi}$$

Figure 5:
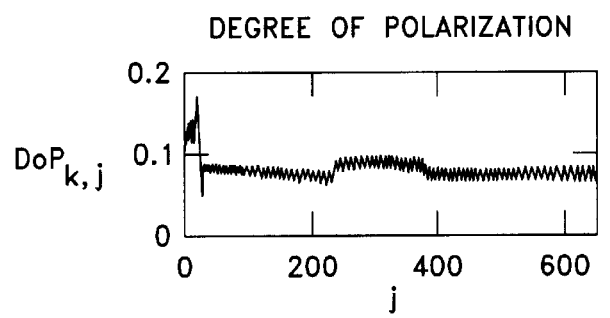
FIGS. 5–12 are graphs of example spatial phase characteristics that are determined for the pixel sequence identified in FIGS. 3 and 4, and that represent information.
Figure 6:
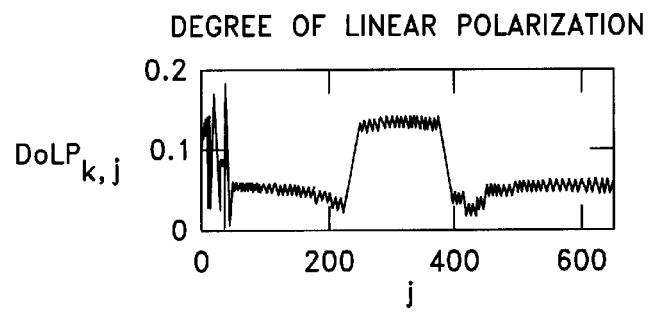
Figure 7:
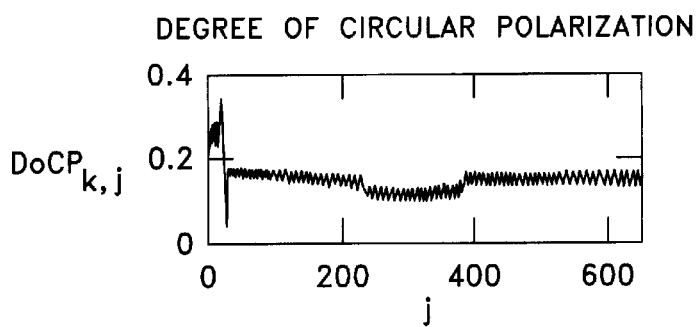
Figure 8:
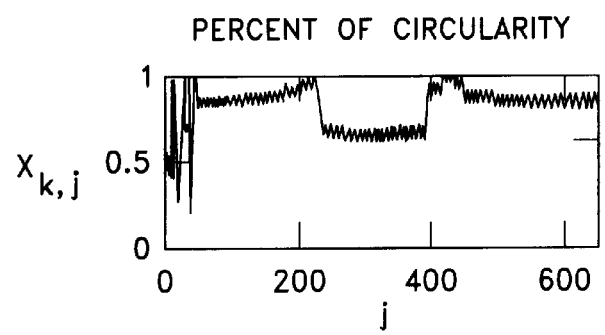
Figure 9:
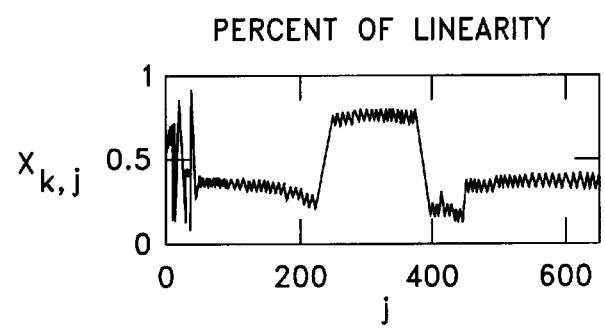
Figure 10:
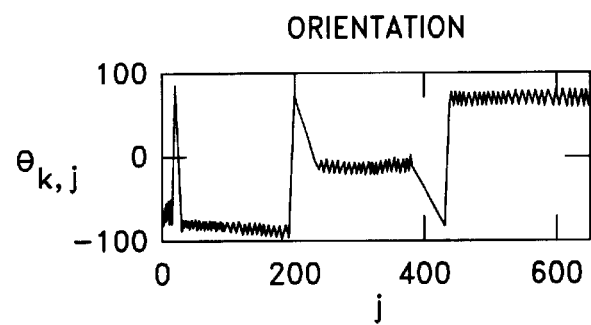
Figure 11:
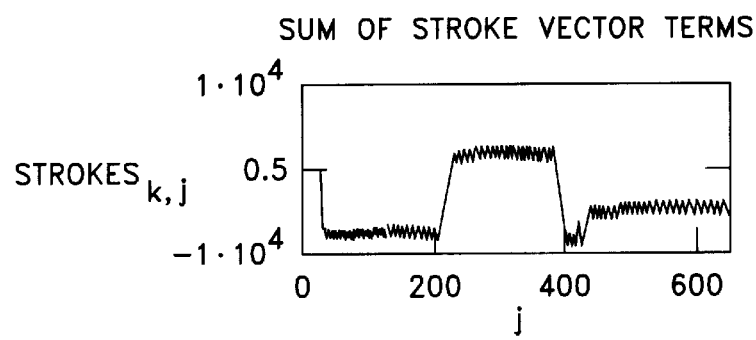
Figure 12:
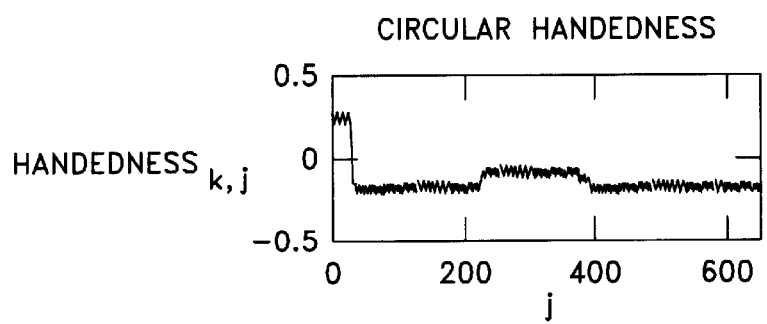

Based upon this derivation of information, degree of polarization (e.g., FIG. 5), degree of linear polarization (e.g., FIG. 6), degree of circular polarization (e.g., FIG. 7), percent of circularity (e.g., FIG. 8), percent of linearity (e.g., FIG. 9), orientation (e.g., FIG. 10), sum of Stokes vector terms (e.g., FIG. 11), and circular handedness (e.g., 12) are provided/derived.

Within the process 10 (FIG. 1) at step 16, the provided/derived information is stored (e.g., compiled). It is to be appreciated that storage or compilation is example-specific and is a needed step only if cross-utilization of the information is unnecessary (e.g., a real-time feed of information to some useful output).

At step 18, the values of the stored information are utilized in further processing equations to produce an information indicator. In the present example of providing an image (FIG. 3) of the box (FIG. 2), a value is generated for each pixel. The generated value may be color, gray-scale, intensity, point-projection (to represent depth), etc. At step 20, the generated value (i.e., information indicator) for the plurality of pixels are stored, at least temporarily (e.g., a buffer). Upon compilation of an overall image set, the generated values are utilized (step 22) to create an image (FIG. 3).

Again, it is to be appreciated that the presented example is simplistic to convey the basic inventive concept. Also, the present invention is not to be limited by the presented example. In this regard, some additional examples of application of the subject invention are provided in U.S. patent application Ser. No. 09/691,741, filed Oct. 18, 2000, which is expressly incorporated herein by reference.

As a specific example of an image process algorithm method and associated concepts, attention is directed to FIGS. 13–24. The example is for polarization sensor imagery. The method requires spatial phase data and determines areas in the scene of relatively high local curvature. By assigning values dependent on curvature to the image data, spherical and ellipsoidal structure can be readily extracted from the scene. Additionally, certain areas of complex curvature offer a potentially strong type of discriminate for objects of inherently curved structure. Candidate objects for using this technique include human faces, human body and aerodynamic structures. In this illustrated example, a baseball (i.e., a 3D object) sitting on a table is imaged. Each generated image (FIGS. 13–16 and 19–24) is of the same scene (i.e., the ball on the table).

The algorithm processes spatial phase data given as data image pairs. Each of the data images has different polarization component recorded. Each pixel (assuming "X" and "Y" image coordinates) of each of the image pairs is regarded as an image surface element. Thus, both data images contain information on the relative distance in the "Z" direction for each surface element. The algorithm combines the image pair data and then scans for areas of high curvature to produce a filter that can be used to segment and discriminate objects of complex curvature within the scene.

It is important to note that the relative "Z" distance is encoded by the relative spatial phase components at each pixel in the image pairs. This fact enables the algorithm to be limited primarily by the image resolution and independent of the range to the target. Thus, the technique is unlike stereo vision. Stereo vision provides depth perception based on parallax or shadow measurements and its accuracy is dependent on the range to the target and many other variables.

A distinct advantage of a curvature filter based on spatial phase data is that it offers a direct way to measure and detect surfaces of variable curvature and local surface discontinuities in slope. This offers an innovative method to extract spatial slope features that are unique to certain types of three-dimensional objects (e.g., faces, body structure). Given the added benefit of range independence, a high-resolution spatial phase sensor using this approach will provide detection of curved objects at distances unachievable by stereoscopic sensors and other conventional sensors.

Figure 13:
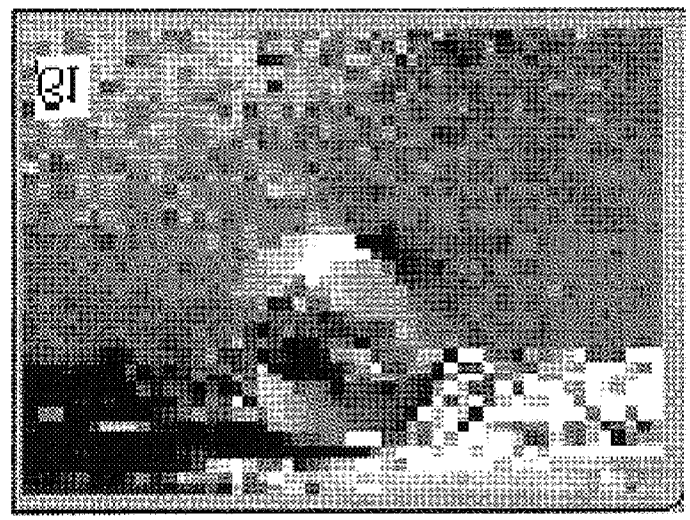
FIGS. 13–16 are images of an example object, each image being created for a different spatial phase characteristic of the electromagnetic energy proceeding from the object.
Figure 14:
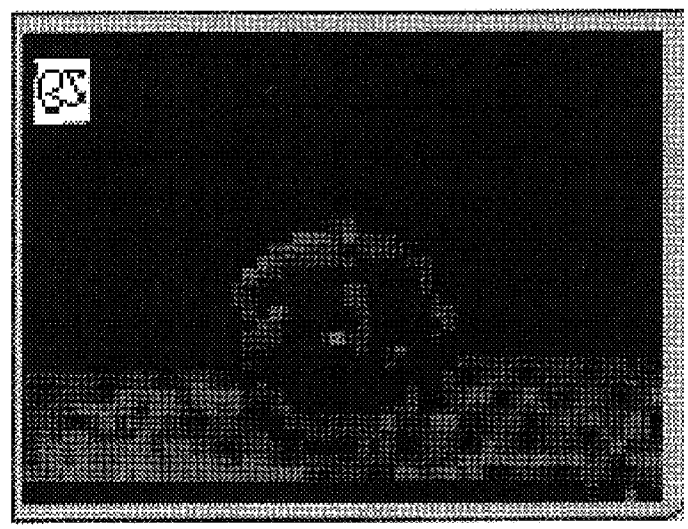

In the illustrated example, the image pairs are Degree of Linear Polarization (DoLP), as shown in FIG. 13, and Orientation, as shown in FIG. 14. As a definition, the DoLP is the information that is proportional to the project angle of a vector normal to the imaged surface elements and projected on a plane perpendicular to the line of sight. Here, DoLP is β1. Orientation is the information that is proportional to the projection angle of a vector normal to the imaged surface elements and projected onto the line of sight. Here, orientation is β2. As such, both images (DoLP and Orientation) are constructed from elements that represent projections of normal vectors emanating from each 3D surface element.

The image resolution is intentionally very low at 38×38 pixels, with an 8-bit depth range. The target of interest (e.g., the baseball) only occupies about 15×15 pixels. It is to be appreciated that merely for ease of ability to illustrate and show the effect of the algorithm, the process is done at the low resolution. It is to be appreciated that the level of resolution is not a limitation on the present invention, and that resolution is a design consideration that takes into account a cost/benefit analysis.

In the example, the data is input as an 8-bit pixel value. Initially the data is normalized, shifted, and rescaled to provide the equivalent of an angle measure given the camera parameters. As such, the DoLP (Degree of Linear Polarization) provides for θ to be scaled data in the range of −90 to +90 degrees and the Orientation provides for φ to be scaled data in the range from −90 to +90 degrees. The relationships between θ and β1, and φ and β2 are:

$$\theta_{x,y} := \left[\frac{(\beta 1_{y,x}) - 128}{255}\right] \cdot \frac{\Pi}{2} \quad \phi_{x,y} := \left(\frac{\beta 2_{y,x}}{255}\right) \cdot \frac{\Pi}{2} + \frac{\Pi}{2}$$

Figure 15:
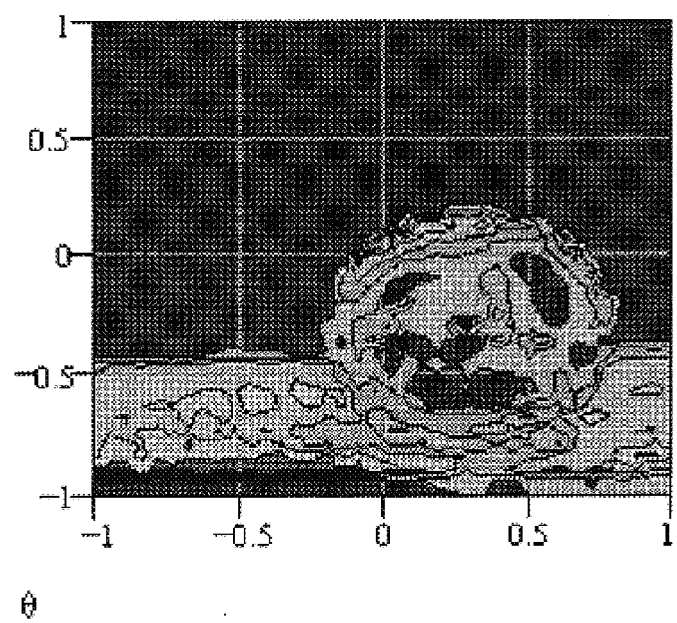
Figure 16:
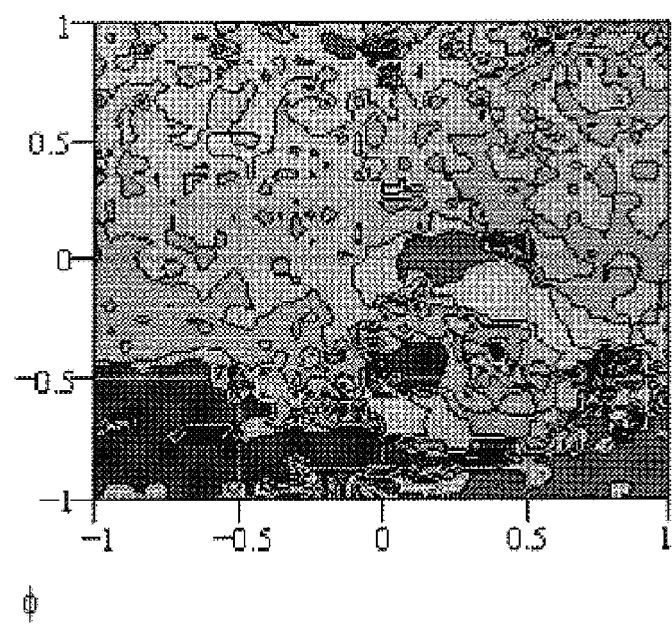

The normalized data of the DoLP (i.e., DoLP=θ) is shown in FIG. 15, and is associated with a definition that the information is scaled to the project angle of a vector normal to the imaged surface elements and projected on a plane perpendicular to the line of sight. The normalized data of the orientation (i.e., orientation=φ) is shown in FIG. 16, and is associated with a definition that the information is scaled to the projection angle of a vector normal to the imaged surface elements and projected onto the line of sight.

Figure 17:
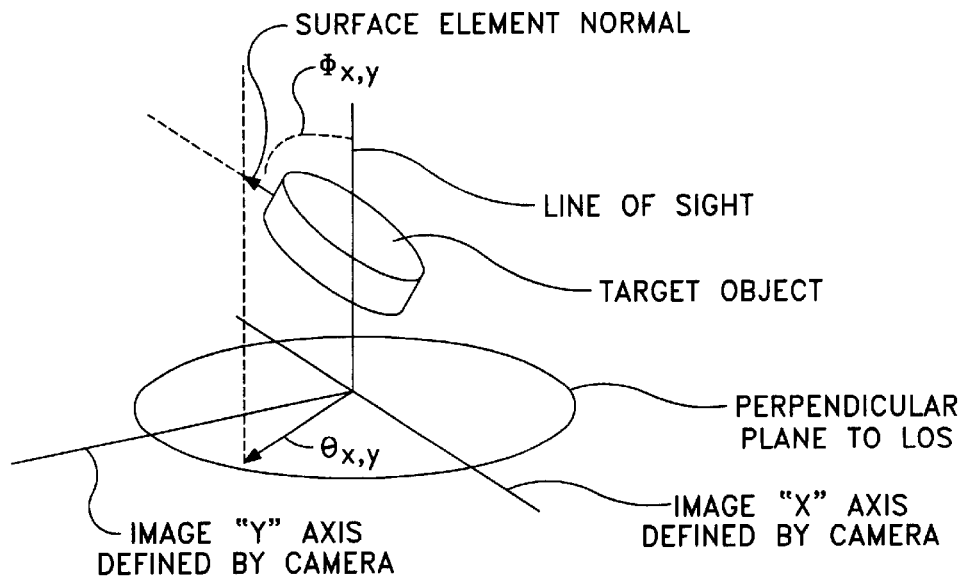
FIGS. 17 and 18 are diagrams indicating geometric relationships for example polarization characteristics of electromagnetic energy proceeding from the object imaged in FIGS. 13–16.

Now, using normalized angle data, the geometry and coordinates that the angles represent can be noted. FIG. 17 illustrates the geometry of the data for a surface element at X, Y. It is to be noted that a given surface element normally can easily be projected onto a plane parallel to the plane defined by the camera LOS and either the X, or the Y-axis also defined by the camera. The motivation for doing this will become apparent upon later computation of an "X-oriented" image slope function.

Figure 18:
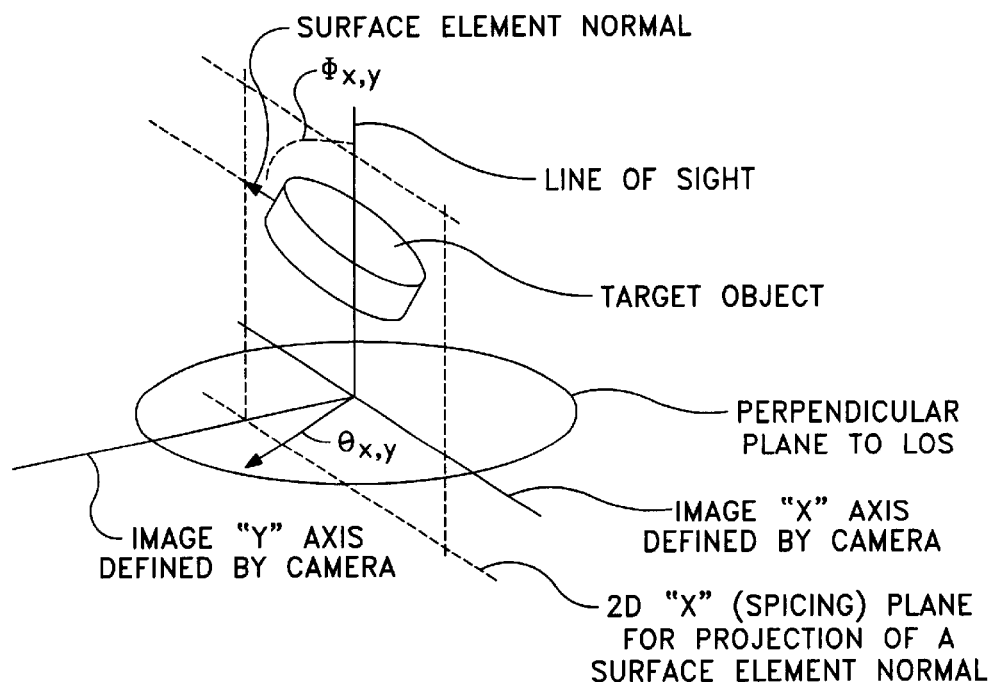

FIG. 18 illustrates the plane (e.g., the "X" plane) projection of the normal. Examining the projection plane in two dimensions, it can be seen that the plane "slices" the target and yields a projected normal to the "slice" of the target. Since the plane provides normalized magnitudes of X and Y components, simple division yields the local slope of the surface at a given surface element or pixel. This slope data will be relative to the choice of slicing plane orientation. A fully general algorithm will process multiple slicing orientations. In the case presented here, we will process a series of "X" oriented planes only. The result is a new data set that uses all the angle information from φ and θ.

The new data set is an array of relative slope values with respect to the choice of slicing plane. We construct this set by first computing the cosines of θ and φ. In a more general algorithm, multiple data sets would be computed as functions of sines and cosines of φ and θ.

$$\zeta_{x,y} := \cos(\theta_{x,y})$$

$$\lambda_{x,y} := \cos(\phi_{x,y})$$

Figure 19:
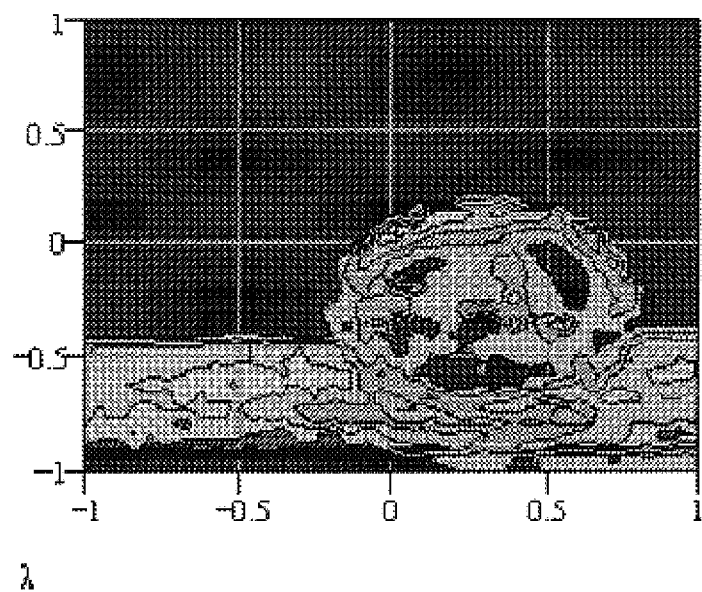
FIGS. 19–24 are images of the example object, each image being created for different spatial phase characteristic (s) of the electromagnetic energy proceeding from the object.
Figure 20:
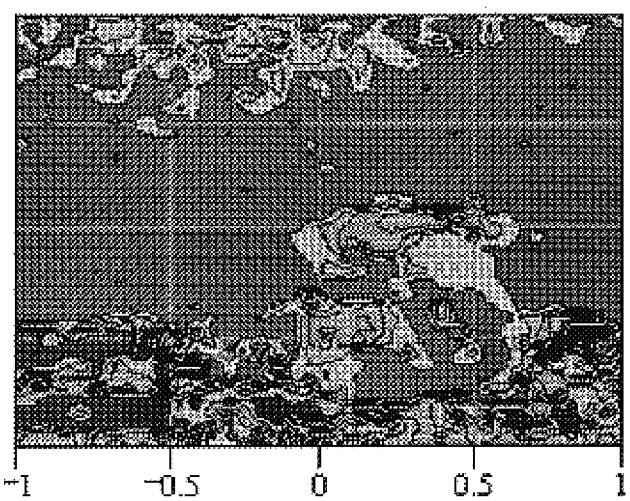
Figure 21:
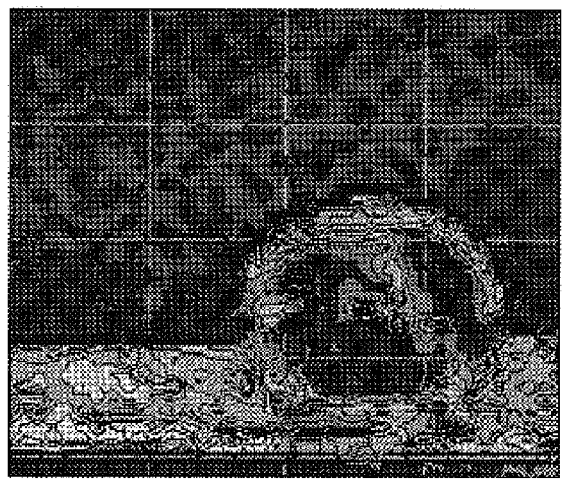

Images that are based upon ζ and λ are shown in FIGS. 19 and 20, respectively.

Image slope function of the data is obtained via division of the computed cosine functions of sines, via the following equation:

$$\Delta_{x,y} := \left(\frac{\lambda_{x,y}}{\zeta_{x,y}}\right)$$

The image slope function (Δ) contains a good deal of polarimetrically derived 3D information. Areas in the image where slopes are steep are clearly seen as dark bands in the image of FIG. 21. The edge of the target object as well as the table edges are pronounced in the Δ data. This is naturally due to the higher slopes recorded by the gathering camera (e.g., a Photon-X camera) in these areas.

The algorithm scans this data set of the image slope function (Δ) and computes a local derivative of the slope. This results in a spatial phase derived curvature map for the image data. In the disclosed example, a discrete derivative is computed in a very simple manner and in only one direction to illustrate the power of the algorithm in providing object detection based on curvature.

The example algorithm below computes a discrete curvature from the above data scanning in the "X" direction from left to right only. This results in a first order estimate (e.g., K1) of the true curvature across the image, yet appears sufficient for detection and separation of the ball from the rest of the image.

$$K1 := \left\| \begin{array}{l} \text{for } i \in 1 \ldots X - 1 \\ \quad \text{for } j \in 0 \ldots Y - 1 \\ \qquad \left\| \begin{array}{l} c_{i,j} \leftarrow \left[\sum_{k=1}^{i} \Delta_{k-1,j} - \Delta_{k,j}\right] \\ z_{i,j} \leftarrow c_{i,j} \end{array} \right. \\ -z \end{array} \right.$$

Figure 22:
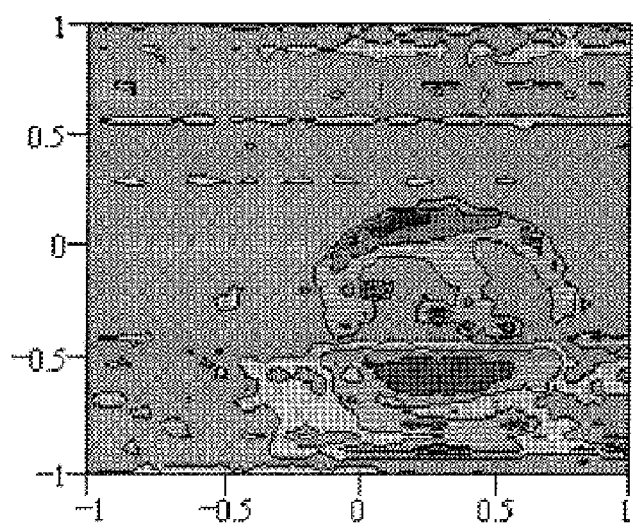

The result of the above computation (i.e., K1) is shown in FIG. 22. Note that the rectangular section of the image has been attenuated.

Figure 23:
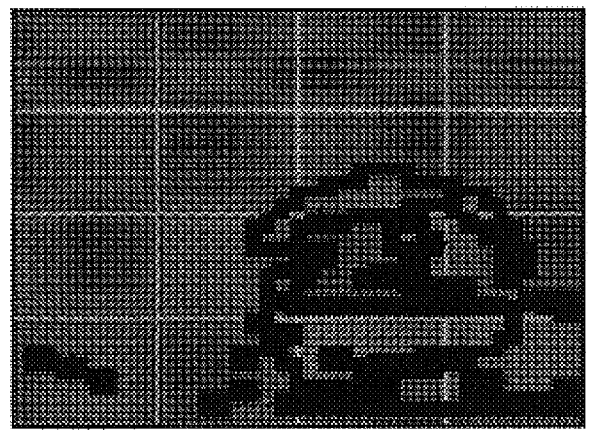
Figure 24:
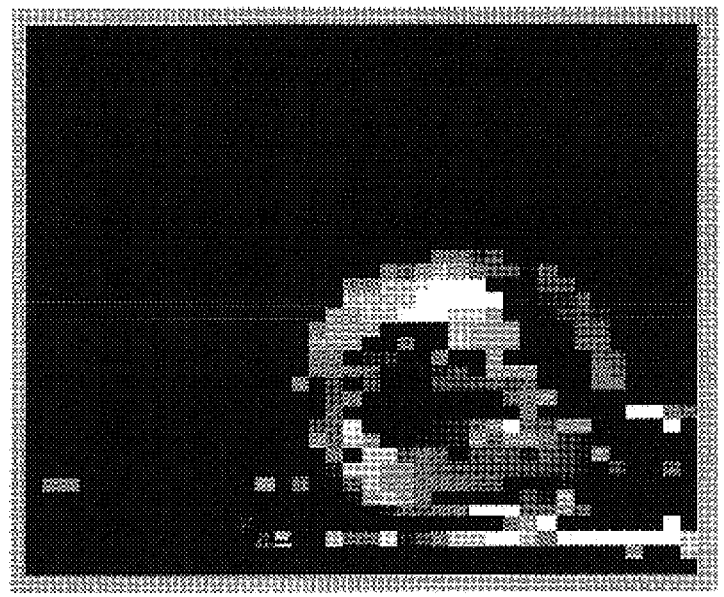

By applying a simple threshold to K1, a first order mask (SEG) is provided to that separate the location of the object in the image. FIG. 23 shows the mask outline. In particular, the mask outline clearly shows the location of the round object, in this case the baseball, while (mostly) ignoring the table. When the mask (SEG, as shown in FIG. 23) is applied to the original image (FIG. 13), the background scene is filtered out leaving the ball. The resulting image is shown in FIG. 14. Thus, via such processing, curved objects, such as the baseball, are easily detected, identified, etc.

Once the image section of interest is located and separated (i.e., segmented), the image slope function (i.e., Δ, FIG. 21) can again be utilized to further investigate the selected image section. It is to be recalled that the slope function contains all the information gathered by the spatial phase camera (e.g., a Photon-X spatial phase camera). The information can be considered as a type of surface element "finger print" of the actual 3-D object. Similar surfaces will possess similar slope functions and unique surface changes such as hollows, dents, bulges, etc., will produce their own unique data set or signature. Additionally, since these data sets were derived by a difference computation, they are relative measures of localized slope changes and are coupled to the object's orientation.

When the object is rotated, the image slope map will rotate with it. This implies that the derived image slope map should be somewhat invariant to the actual line of sight of the camera.

Construction of a discrimination function can be approached using the image slope map after segmentation of the area of interest in the scene. This requires a baseline 3-D model of the target of interest. Given a 3-D model of a human head, one could record spatial phase data from a variety of orientations and compute the image slope functions discussed above for several orientations. A database of such functions for multiple subjects could then be compared to a segmented image using a variety of metrics to determine a classification of the image segment.

One such metric can be created by construction of a 2-D Fourier transform-based correlation filter. Another metric could be generated by using the technique of self-organizing Neural Net vector quantization.

A potential advantage of this type of discrimination is that surface shapes are identified, used, etc. Thus, a subject with a large nose, pronounced forehead, or particularly hollow cheeks would be clearly detected. This method also has some advantages if the subjects try to camouflage, or change their appearance. Using makeup or hoods to cover the head and face could be defeated when using emissive IR to collect the spatial phase data.

Of course, various other techniques and applications find use of the data. For example, a 3-D plot can be generated by the measured data. As such, spatial phase technology can address one or more short-coming of the prior (e.g., created a 3-D image (1) from a single line of sight, (2) in variable lighting conditions, and (3) over extended ranges).

Specifically, direction cosines can be measured at every pixel in a scene. The x+y cosines can be defined as:

$\cos\theta_{x,y}$ $\cos\phi_{x,y}$

The Z-axis or aspect angle has a direct relationship to the degree of polarization. For emitted sources, the spatial phase products will increase with increasing angle from the observation point. For reflected sources that are 180° out-of-phase with the emitted sources, the increase in angle is toward the observation plane. Thus, it to be noted that:

$\cos\Psi_z \sim S_{\perp 90}{}^\circ + S_{\perp 135}{}^{45}$ /Total Intensity where $S_{\perp 90}{}^\circ$ is the orthogonal slice in the 0+90 planes and $S_{\perp 135}{}^{45}$ is the orthogonal slice in the 45+135 planes.

By slicing the object up into its planar components, the orientation (x, y, z) of the surface area contained by that pixel are directly measured. In an nXm image array, the approach is repeated (e.g., the (n+1)Xm pixel and the nX(m+1) pixel). Thus, each pixel has x, y, z coordinates.

To plot 3-D objects or to reconstruct 3D shapes, each pixel must be connected to its nearest pixel neighbors. In some respects, the values at the pixels along a column/row are linked somewhat like a graph. Each slice of the rows and columns can be combined by using each of the edges of the pixel as continuous elements. Pixels can also be broken down into convention facets. Also, pixels can be broken down into two or four triangles. Each corner or side of such triangles may have a different weight associated therewith during linking to adjacent triangles.

Another example of a specific application that the present invention provides is high-speed tracking and motion analysis of a moving object. Specifically, via processing of image data, the motion of the object relative to a background is determined. Also, via processing of image data, relative motion(s) of portions of the object (e.g., spinning object) are determined.

In one example, a ball that has portions with distinct spatial-phase characteristics is readily tracked and its motion analyzed. The portions of the ball with distinct spatial-phase characteristics can be any shape, size location. In one specific example, the portions are arranged as sections of longitude that converge at imaginary poles on the ball and which have maximum width at an imaginary equator of the ball. Such a pattern is found on the common place beach ball. As the ball rotates, the ball presents different portions and different locations of the portions to the viewing camera. With a slow speed camera, the ball image will blur across image pixels. However, the blur is modulated at a frequency proportional to the spin of the ball. Distance of travel of the ball is calculated by measuring the indicative pixels across the image array and taking a frame integral over time.

Of course, it is to be appreciated that the present invention provides many other specific applications. Some examples include the tracking of pre-designed tags on objects (e.g., tags on sports participants), conveyance (e.g., transmission and/or reception) of communication data (e.g., via generation and/or processing of electromagnetic energy to convey data for telecommunications and the like).

Turning attention to communication data, it is to be appreciated that the present invention is contemplated to have applications in any of the numerous known techniques and methodologies and also techniques and methodologies that will be developed to benefit from the advances offered by the present invention. In general for the known techniques and methodologies, data is conveyed via change (e.g., modulation) of a parameter of transmitted EM energy. Among the several examples of the known techniques and methodologies some specifics include amplitude modulation (AM), frequency modulation (FM), quadrature amplitude modulation (QAM), phase modulation, pulse width modulation (PWM), amplitude shift keying (ASK), frequency shift keying (FSK), etc. For all of the mentioned examples and many others, spatial phase characteristics of electromagnetic energy can be utilized to convey information, with the potential benefit conveyance of greater quantities of information.

Of course, many other specific applications are contemplated. It is to be understood that all of the specific applications are intended to be within the scope of the subject invention. In sum, the present invention for the use of spatial phase can be used (e.g., added) to any sensor that senses electromagnetic radiation. The sensing may be by temporal, spectral, spatial, or by raw amplitude sensing.

From the above description of the invention, those skilled in the art will perceive improvements, changes and modifications. Such improvements, changes and modifications within the skill of the art are intended to be covered by the appended claims.

Having described the invention, the following is claimed:

1. A method of deriving increased information from electromagnetic energy, said method comprising:
   determining values of any of several spatial phase characteristics of the electromagnetic energy; and
   using the determined spatial phase characteristic values in a manner to provide information;
   wherein said step of determining values of any of several spatial phase characteristics of the electromagnetic energy includes determining at least one spatial phase characteristic value at each of a plurality of point elements of an image plane associated with the electromagnetic energy, and said step of using the determined spatial phase characteristic values in a manner to provide information includes using differences in the determined at least one spatial phase characteristic values at each of a plurality of point elements to generate an image.

2. A method as set forth in claim 1, wherein said step of determining at least one spatial phase characteristic value at each of a plurality of point elements of an image plane associated with the electromagnetic energy includes determining a non-intensity spatial phase characteristic value at each of the plurality of point elements.

3. A method as set forth in claim 2, wherein said step of determining a non-intensity spatial phase characteristic value at each of the plurality of point elements includes determining a polarization characteristic value at each of the plurality of point elements.

4. A method as set forth in claim 2, wherein said step of using the determined spatial phase characteristic values in a manner to provide information includes providing a three-dimensional representation value at each of the plurality of point elements that is dependent upon the determined non-intensity spatial phase characteristic value at the respective point element.

5. A method as set forth in claim 2, wherein said step of determining at least one spatial phase characteristic value at each of a plurality of point elements of an image plane associated with the electromagnetic energy includes determining the non-intensity spatial phase characteristic value at each of the plurality of point elements with the electromagnetic energy having minimal intensity contrast among the plurality of point elements, and said step of using the determined spatial phase characteristic values in a manner to provide information includes providing a contrast-indicative representation value at each of the plurality of point elements that is dependent upon the determined non-intensity spatial phase characteristic value at the respective point element.

6. A method as set forth in claim 1, wherein said step of determining values of any of several spatial phase characteristics of the electromagnetic energy includes determining at least one spatial phase characteristic value at each of a plurality of portions of a conveyed electromagnetic energy, and said step of using the determined spatial phase characteristic values in a manner to provide information includes using differences in the determined at least one spatial phase characteristic values at each of a plurality of portions to demodulate a data stream.

7. A method as set forth in claim 1, including sensory operation of a non-spatial phase sensor, determining value of at least one non-spatial phase characteristic, and using the determined value of the at least one non-spatial phase characteristic to provide information, the information determined from the spatial phase characteristic being used in conjunction with the information determined from the spatial phase characteristic to provide an increase volume of information.

8. A method of deriving increased information from electromagnetic energy, said method comprising:
determining one quantitative-existence value related to at least one spatial phase characteristic of the electromagnetic energy for one portion of electromagnetic energy;
determining another quantitative-existence value related to at least another spatial phase characteristic of the electromagnetic energy for the one portion of electromagnetic energy or the one spatial phase characteristic of the electromagnetic energy for another portion of electromagnetic energy;
quantifying the one quantitative-existence value relative to the other quantitative-existence value; and
using the quantification of the one quantitative-existence value relative to the other quantitative-existence value as information.

9. A method as set forth in claim 8, wherein said step of determining the one quantitative-existence value includes calculating a value of the one spatial phase characteristic as the one quantitative-existence value.

10. A method as set forth in claim 9, wherein said step of calculating a value of the one spatial phase characteristic as the one quantitative-existence value includes calculating a polarization value.

11. A method as set forth in claim 8, wherein said step of determining the one quantitative-existence value includes using a value of the one spatial phase characteristic in an algorithm whose product is the one quantitative-existence value.

12. A method as set forth in claim 11, wherein said algorithm is a stokes vector equation.

13. A method as set forth in claim 8, wherein said step of determining another quantitative-existence value is the determination of the value related to at least another spatial phase characteristic of the electromagnetic energy for the one portion of electromagnetic energy.

14. A method as set forth in claim 13, wherein the one and another quantitative-existence values are two, different polarization values.

15. A method as set forth in claim 13, wherein the one and another quantitative-existence values are the products of two, different stokes vector equations.

16. A method as set forth in claim 8, wherein said step of determining another quantitative-existence value is the determination of the one spatial phase characteristic of the electromagnetic energy for another portion of electromagnetic energy.

17. A method as set forth in claim 16, wherein the one and the other portions of the electromagnetic energy are two, different points on an image matrix.

18. A method as set forth in claim 16, wherein the one and the other portions of the electromagnetic energy are different portions derived at different time points.

19. A method as set forth in claim 8, wherein said step of using the quantification of the one quantitative-existence value relative to the other quantitative-existence value includes using differences to demodulate a data stream.

* * * * *